(12) United States Patent
Schmitz et al.

(10) Patent No.: US 8,131,525 B2
(45) Date of Patent: Mar. 6, 2012

(54) SYSTEM AND METHOD FOR TOOL POINT PREDICTION USING MULTI-COMPONENT RECEPTANCE COUPLING SUBSTRUCTURE ANALYSIS

(75) Inventors: Tony L. Schmitz, Gainesville, FL (US); Gregory S. Duncan, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 687 days.

(21) Appl. No.: 11/910,947

(22) PCT Filed: Apr. 7, 2006

(86) PCT No.: PCT/US2006/013089
§ 371 (c)(1),
(2), (4) Date: Oct. 8, 2007

(87) PCT Pub. No.: WO2006/108150
PCT Pub. Date: Oct. 12, 2006

(65) Prior Publication Data
US 2008/0195364 A1 Aug. 14, 2008

Related U.S. Application Data

(60) Provisional application No. 60/669,093, filed on Apr. 7, 2005.

(51) Int. Cl.
*G06G 7/48* (2006.01)
(52) U.S. Cl. .............................. 703/7; 700/160; 700/177
(58) Field of Classification Search .................. 703/1, 6, 703/7; 409/64–242; 700/159, 160, 175, 700/177
See application file for complete search history.

(56) References Cited

U.S. PATENT DOCUMENTS

| | | |
|---|---|---|
| 5,170,358 A | 12/1992 | Delio |
| 2002/0146296 A1 | 10/2002 | Schmitz et al. |
| 2004/0236529 A1 | 11/2004 | Esterling |
| 2005/0021265 A1 | 1/2005 | Esterling |

OTHER PUBLICATIONS

Peter Steffen, "On Digital Smoothing Filters: A Brief Review of Closed Form Solutions and Two New Filter Approaches", Circuits Systems Signal Processing, vol. 5, No. 2, 1986, pp. 187-210.*
Tamas Insperger et al. "Comparison of Analytical and Numerical Simulations for Variable Spindle Speed Turning", Proceedings of IMECE'03: 2003 ASME International Mechanical Engineering Congress, Nov. 16-21, 2003, Washington, DC, USA.*
Zhilin Li, "Finite Difference Methods Basics", (retrieved from http://web.archive.org/web/20031214191847/http://www4.ncsu.edu/~zhilin/TEACHING/MA402/notes1.pdf), published on Dec. 14, 2003.*

(Continued)

*Primary Examiner* — Russell Frejd
(74) *Attorney, Agent, or Firm* — Alston & Bird LLP

(57) ABSTRACT

A method for predicting a tool point response of a spindle-holder-tool assembly to be used for high-speed machining applications is provided. The method includes determining direct and cross displacement-to-force receptances of a standard holder clamped in the spindle. The method also includes determining direct receptances at a free end of the standard holder based upon the determined direct and cross displacement-to-force receptances of the standard holder. Additionally, the method includes performing an inverse receptance coupling to simulate a decomposition of the standard holder into multiple subassemblies, the subassemblies including a spindle-holder base subassembly and an extended holder subassembly. The method further includes determining spindle-holder base subassembly receptances based upon the simulated decomposition of the standard holder.

13 Claims, 7 Drawing Sheets

OTHER PUBLICATIONS

David M. Shamine et al., "Analysis of No. 50 Taper Joint Stiffness Under Axial and Radial Loading" (Journal of Manufacturing Processes, vol. 2, No. 3, 2000, pp. 167-173.*

Simon S. Park et al., "Receptance coupling for end mills" (International Journal of Machine Tools & Manufacture, vol. 43, No. 9, Jul. 2003, pp. 889-896.*

Manfred U. A. Bromba et al., "Application Hints for Savitzky-Golay Digital Smoothing Filters", Analytical Chemistry, vol. 53, No. 11, 1981, pp. 1583-1586.*

E. B. Kivanc et al., "Structural modeling of end mills for form error and stability analysis", International Journal of Machine Tools & Manufacture, vol. 44, No. 11, pp. 1151-1161.*

Aaron Joseph Kiefer, "Integrating Electromechanical Actuator Hardware with Receptance Coupling Substructure Analysis for Chatter Prediction on High Speed Machining Centers", Master Degree thesis at North Carolina State University in Raleigh, NC, USA, Mar. 2004, pp. 26-34.*

Duncan et al, An Investigation of the Dynamic Absorber Effect in High-Speed Machining, International Journal of Machine Tools and Manufacture, vol. 45, No. 4-5, Apr. 2005, pp. 497-507.*

Park et al, Receptance Coupling for End Mills, International Journal of Machine Tools and Manufacture, vol. 43, No. 9, Jul. 2003, pp. 889-896.*

Schmitz et al., Tool Point Frequency Response Prediction for High-Speed Machining by RCSA, J. Manufacturing Sci. & Eng., Nov. 2001, vol. 123, pp. 700-707.

Tony L. Schmitz, G. Scott Duncan: "Three-Component Receptance Coupling Substructure Analysis for Tool Point Dynamics Prediction" Journal of Manufacturing Science and Engineering, vol. 127, Nov. 2005, pp. 781-790.

Tony L. Schmitz, Timothy J. Burns: "Receptance Coupling for High-Speed Machining Dynamic Predictions", Proceedings of IMAC-XXI: Conference & Exposition of Structural Dynamics, Feb. 6, 2003, pp. 1-7.

Craig, Jr., R.R.: "A Review of Time-Domain and Frequency Domain Component-Mode Synthesis Methods", International Journal of Analytical and Experimental Modal Analysis, Apr. 1987, pp. 59-72.

* cited by examiner

SYSTEM AND METHOD FOR TOOL POINT PREDICTION USING MULTI-COMPONENT RECEPTANCE COUPLING SUBSTRUCTURE ANALYSIS

CROSS-REFERENCE TO RELATED APPLICATIONS

This application is a §371 national stage entry of International Application No. PCT/US2006/013089, filed Apr. 7, 2006, which claims priority to U.S. Provisional Application No. 60/669,093, filed Apr. 7, 2005, both of which are hereby incorporated by reference.

FEDERALLY SPONSORED RESEARCH OR DEVELOPMENT

This invention was made with United States Government support under grant number N00014-03-1-0582 awarded by The Office of Naval Research and grant number DMI-0238109 awarded by The National Science Foundation. The United States Government has certain rights in the invention.

FIELD OF THE INVENTION

The present invention relates generally to the field of machine tools. More specifically, the present invention relates generally to methods of and apparatuses for increasing stability and/or preventing chatter in a machine tool assembly.

BACKGROUND

One area of manufacturing research that has made significant technological advancements in recent years is high-speed machining. Machine improvements include new spindle designs for higher rotational speed, torque, and power; increased slide speeds, accelerations, and direct drive linear motor technology; and new machine designs for lower moving mass. The combination of new machine technology and tool material/coating developments makes high-speed machining a viable alternative to other manufacturing processes. For example, high-speed machining has been applied in the aerospace industry, where the dramatic increases in material removal rates made possible using high-speed machining techniques have allowed designers to replace assembly-intensive sheet metal build-ups with monolithic aluminum components, resulting in substantial cost savings.

However, during a metal cutting operation, any vibratory motion between a cutting tool and workpiece may lead to non-beneficial cutting performances. Furthermore, such vibration may cause the cutting tool or the machine tool to become damaged. Excessive vibrations, frequently called "chatter," between the cutting element of a machine tool and the surface of the workpiece cause poor surface finish, tool breakage and other unwanted effects that have long plagued machining operations. Such vibrations arise especially when the tool includes a long unsupported length that will permit deflection of the tool. When chatter does occur the machining parameters should be changed and as a result productivity may be adversely affected. In machining operations, chatter is also one of the primary limitations to high material removal rates.

Many research efforts geared toward the understanding and avoidance of chatter have been carried out. This work has led to the development of stability lobe diagrams that identify stable and unstable cutting zones as a function of the chip width and spindle speed. However, the methods used to produce these diagrams, whether analytic or time-domain, require knowledge of the tool point dynamics. The required dynamic model is typically obtained using impact testing, where an instrumented hammer is used to excite the tool at its free end (i.e., the tool point) and the resulting vibration measured using an appropriate transducer, typically a low mass accelerometer. However, due to the large number of spindle, holder, and tool combinations, the required testing time may be significant.

One research effort, in particular, is set forth in U.S. Pat. No. 5,170,358 to Delio. In this reference, the cutting signal obtained while machining is monitored and the spectral content is observed to identify preferred spindle speeds for chatter avoidance. However, this reference requires that the measurements be performed after cutting tests. The method makes no attempt to produce a pre-process stability lobe diagram. Rather, by using information obtained during an actual chattering (unstable) cut at a selected axial depth of cut, recommendations for chatter free spindle speed(s) may be made.

To produce a stability lobe diagram, the dynamic response of the machine-spindle-holder-tool (as reflected at the free end of the tool, or tool point) should be known. This data may be obtained by performing a dynamic test on the machine-spindle-holder-tool in question, but the dynamic response changes if a new holder or tool (or new tool length) is used, so the measurement should be repeated. This requirement is often not practical for a production environment.

Accordingly, it would be beneficial to provide a model that is able to predict a tool point response based on minimum input. It would also be beneficial to provide a model that is able to predict a tool point response to permit a stability lobe diagram to be created for a particular spindle-holder-tool.

SUMMARY

Accordingly, the present invention provides predictions of tool point responses for machining applications. The present invention provides the predictions based upon a measurement of the spindle and models or measurements of the holder and tool.

One embodiment of the invention is a system for predicting a tool point response of a spindle-holder-tool assembly used for high-speed, machining applications. The system can include a displacement-to-force receptance determining module for determining direct and cross displacement-to-force receptances of a standard holder based on received data. The system further can include a direct receptances determining module for determining direct receptances at a free end of the standard holder based upon the determined direct and cross displacement-to-force receptances of the standard holder. Additionally, the system can include a decomposition module for simulating a decomposition of the standard holder into a plurality of subassemblies comprising a spindle-holder base subassembly and an extended holder subassembly, the decomposition based upon inverse receptance coupling. The system also can include a subassembly receptances determining module for determining spindle-holder base subassembly receptances based upon the simulated decomposition of the standard holder.

Another embodiment of the invention is a method for predicting a tool point response of a spindle-holder-tool assembly used for high-speed machining applications. The method can include determining direct and cross displacement-to-force receptances of a standard holder clamped in the spindle. The method also can include determining, based upon the determined direct and cross displacement-to-force receptances of the standard holder, direct receptances at a free end of the standard holder. Additionally, the method can include performing an inverse receptance coupling to simulate a decomposition of the standard holder into a plurality of subassemblies, the plurality of subassemblies comprising a spindle-holder base subassembly and an extended holder subassembly. The method further can include determining spindle-holder base subassembly receptances based upon the simulated decomposition of the standard holder.

Yet another embodiment of the invention is is method for determining a stability lobe diagram that graphically depicts regions of stable and unstable process parameter combinations for performing high-speed machining. The method can include determining spindle receptances using a standard holder model. The method also can include coupling a spindle model to an extended holder model using a first connection. Additionally, the method can include coupling a tool model to the spindle-holder using a second connection to develop a model of the spindle-holder-tool assembly. The method further can include generating the stability lobe diagram for the spindle-holder-tool.

BRIEF DESCRIPTION OF THE DRAWINGS

Other objects, features and advantages of the present invention will become apparent upon reading the following detailed description, while referring to the attached drawings, in which.

DETAILED DESCRIPTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise.

The present invention encompasses a system and related methods for predicting tool point responses of high-speed machining applications. One aspect of the invention is a technique for dividing a spindle-holder-tool assembly into multiple substructures, which can generally be characterized as a spindle-holder base, extended holder, and tool. Tool and extended holder receptances can be determined analytically, as described herein. Spindle holder base subassembly receptances can be determined based upon empirical data derived using a standard, or model, test holder and performing certain calculations, as also described herein.

Figure 1:
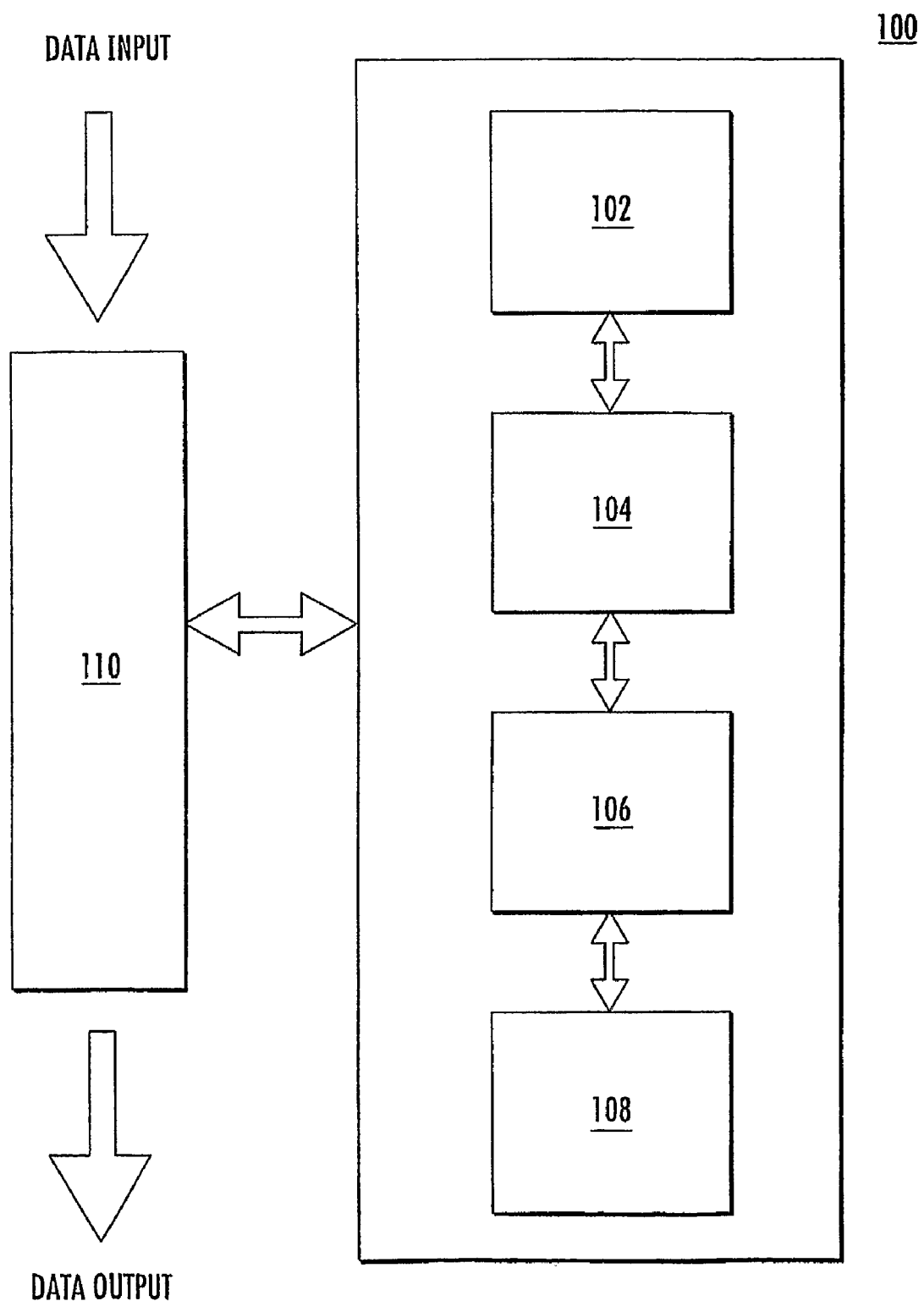
FIG. 1 is a schematic diagram of a system for predicting a tool point response of a high-speed machining application, according to one embodiment of the invention.

Referring initially to FIG. 1, a system 100 for predicting a tool point response of a high-speed machining application, according to one embodiment, is shown schematically illustrated. The system 100 illustratively includes a displacement-to-force receptance determining module 102, a direct receptances determining module 104, a decomposition module 106, and a subassembly receptances determining module 108, each of the modules being communicatively linked to one another. The modules 102-108 cooperatively operate to produce tool point predictions according to the techniques described herein. The predictions, as also described herein, are generated based on received receptance data, the data being manipulated by the respective modules 102-108.

Illustratively, the system 100 further includes an input/output (I/O) interface 110, as will be readily understood by one of ordinary skill in the art. The receptance data as well as the predictions generated by data manipulation performed by the respective modules 102-108 are received and supplied, respectively, via the I/O interface 110. The modules 102-108 can be implemented in dedicated hardwired circuitry for performing the functions described herein. Alternatively, the modules 102-108 can be implemented in software code configured to run on one or more logic-based processors. According to still another embodiment, the modules can be implemented in a combination of hardwired circuitry and software code.

Operatively, the displacement-to-force receptance determining module 102 determines direct and cross displacement-to-force receptances of a standard holder based on received data. The received data, more particularly, can be generated by inserting a standard holder of a simple geometry into the spindle and measuring the direct and cross dynamic responses of the spindle-holder assembly.

The direct receptances determining module 104 determines direct receptances (both translational and rotational) at the free end of the standard holder (when inserted in the spindle) based upon the determined direct and cross displacement-to-force receptances. The decomposition module 106 simulates a decomposition of the standard holder. More particularly, the decomposition module 106 can decompose the standard holder into a plurality of subassemblies. According to one embodiment, the plurality of subassemblies includes a spindle-holder base subassembly and an extended holder subassembly. As described more particularly below, the decomposition performed by the decomposition module 106 is based upon inverse receptance coupling. Additionally, the subassembly receptances determining module 108 then determines spindle-holder base subassembly receptances based upon the simulated decomposition of the standard holder. Once the spindle-holder base subassembly receptances are known, any combination of holder and tool can be coupled (in simulation) to this result in order to predict the specific spindle-holder-tool dynamic response at the free end of the tool.

Figure 2:
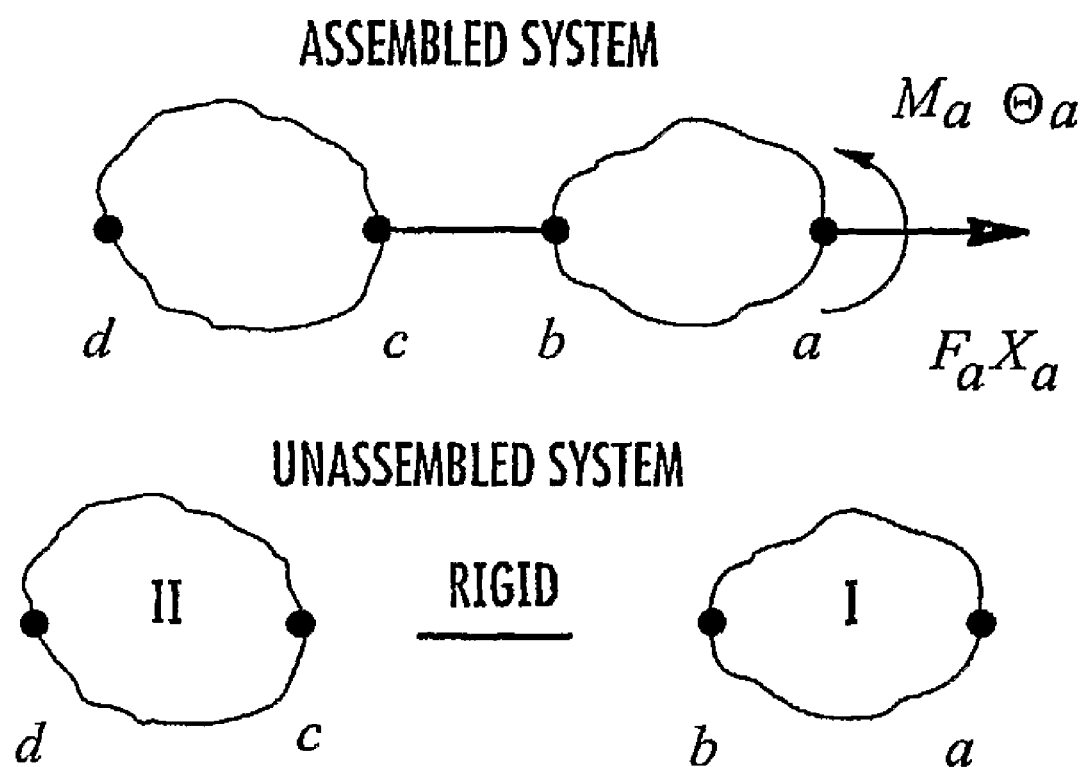
FIG. 2 is a schematic diagram of an assembly having two rigidly connected substructures that can represent a spindle-holder assembly whose performance is analyzed by the system of FIG. 1.

The theoretical basis of the procedures performed by the respective modules 102-108 follows from the fact that components can be represented by spatial mass, stiffness and damping data, modal data, or receptances. The latter representation is beneficial in situations where the assembly receptances are the selected analysis output, as is the case in one embodiment of the present invention. For an assembly having two rigidly connected substructures, as shown in FIG. 2, the assembly receptance, $G_{jk}(\omega)$, can be expressed as shown in Eq. (1), where $\omega$ is the frequency, $X_j$ and $\Theta_j$ are the assembly displacement and rotation at coordinate j, and $F_k$ and $M_k$ are the force and moment applied to the assembly at coordinate k. If coordinate j is coincident with coordinate k, the receptance is referred to as a direct receptance; otherwise, it is a cross receptance. For the purposes of this application, the nomenclature $G_{jk}(\omega)$ is used to describe the receptances that are produced when two substructures (or subassemblies) are coupled to produce the final assembly. The nomenclature $GS_{jk}(\omega)$ will replace $G_{jk}(\omega)$ in all relevant equations when two substructures (or subassemblies) are coupled that do not form the final assembly.

$$G_{jk}(\omega) = \begin{bmatrix} \frac{X_j}{F_k} & \frac{X_j}{M_k} \\ \frac{\Theta_j}{F_k} & \frac{\Theta_j}{M_k} \end{bmatrix} = \begin{bmatrix} H_{jk} & L_{jk} \\ N_{jk} & P_{jk} \end{bmatrix} \quad (1)$$

The substructure receptances, $R_{jk}(\omega)$, are defined in Eq. (2), where $x_j$ and $\theta_j$ are the substructure displacement and rotation at coordinate j, and $f_k$ and $m_k$ are the force and moment applied to the substructure at coordinate k.

$$R_{jk}(\omega) = \begin{bmatrix} \frac{x_j}{f_k} & \frac{x_j}{m_k} \\ \frac{\theta_j}{f_k} & \frac{\theta_j}{m_k} \end{bmatrix} = \begin{bmatrix} h_{jk} & l_{jk} \\ n_{jk} & p_{jk} \end{bmatrix} \quad (2)$$

Based on the coordinates illustrated in FIG. 2, the equations to determine the assembly direct receptances, $G_{aa}(\omega)$ and $G_{dd}(\omega)$, and the assembly cross receptances, $G_{ad}(\omega)$ and $G_{da}(\omega)$, may be written as a function of the substructure receptances as shown in Eqs. (3-6), where rigid connections have been applied.

$$G_{aa}(\omega) = \begin{bmatrix} \frac{X_a}{F_a} & \frac{X_a}{M_a} \\ \frac{\Theta_a}{F_a} & \frac{\Theta_a}{M_a} \end{bmatrix} \quad (3)$$
$$= R_{aa}(\omega) - R_{ab}(\omega)[R_{bb}(\omega) + R_{cc}(\omega)]^{-1} R_{ba}(\omega)$$

$$G_{dd}(\omega) = \begin{bmatrix} \frac{X_d}{F_d} & \frac{X_d}{M_d} \\ \frac{\Theta_d}{F_d} & \frac{\Theta_d}{M_d} \end{bmatrix} \quad (4)$$
$$= R_{dd}(\omega) - R_{dc}(\omega)[R_{bb}(\omega) + R_{cc}(\omega)]^{-1} R_{cd}(\omega)$$

$$G_{ad}(\omega) = \begin{bmatrix} \frac{X_a}{F_d} & \frac{X_a}{M_d} \\ \frac{\Theta_a}{F_d} & \frac{\Theta_a}{M_d} \end{bmatrix} = R_{ab}(\omega)[R_{bb}(\omega) + R_{cc}(\omega)]^{-1} R_{cd}(\omega) \quad (5)$$

$$G_{da}(\omega) = \begin{bmatrix} \frac{X_d}{F_a} & \frac{X_d}{M_a} \\ \frac{\Theta_d}{F_a} & \frac{\Theta_d}{M_a} \end{bmatrix} = R_{dc}(\omega)[R_{bb}(\omega) + R_{cc}(\omega)]^{-1} R_{ba}(\omega) \quad (6)$$

To populate the substructure receptance matrices, measurement and modeling can be applied. Common modeling options include closed-form expressions for uniform Euler-Bernoulli beams and finite element solutions (which may incorporate the Timoshenko beam model), as will be readily understood by one of ordinary skill in the art.

Figure 3:
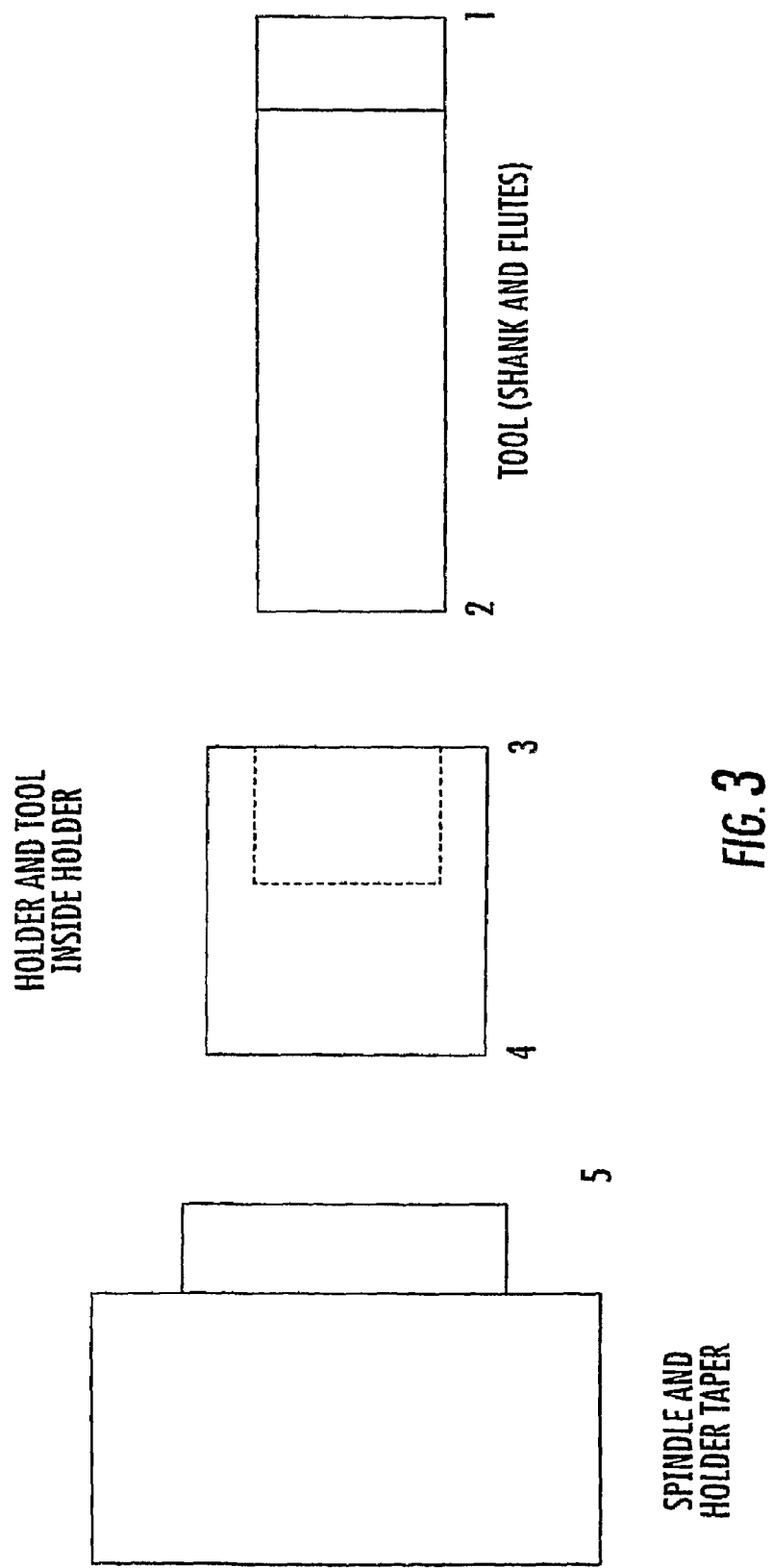
FIG. 3 is a schematic diagram of an exemplary spindle-holder-tool model which can be analyzed by the system of FIG. 1
Figure 4:
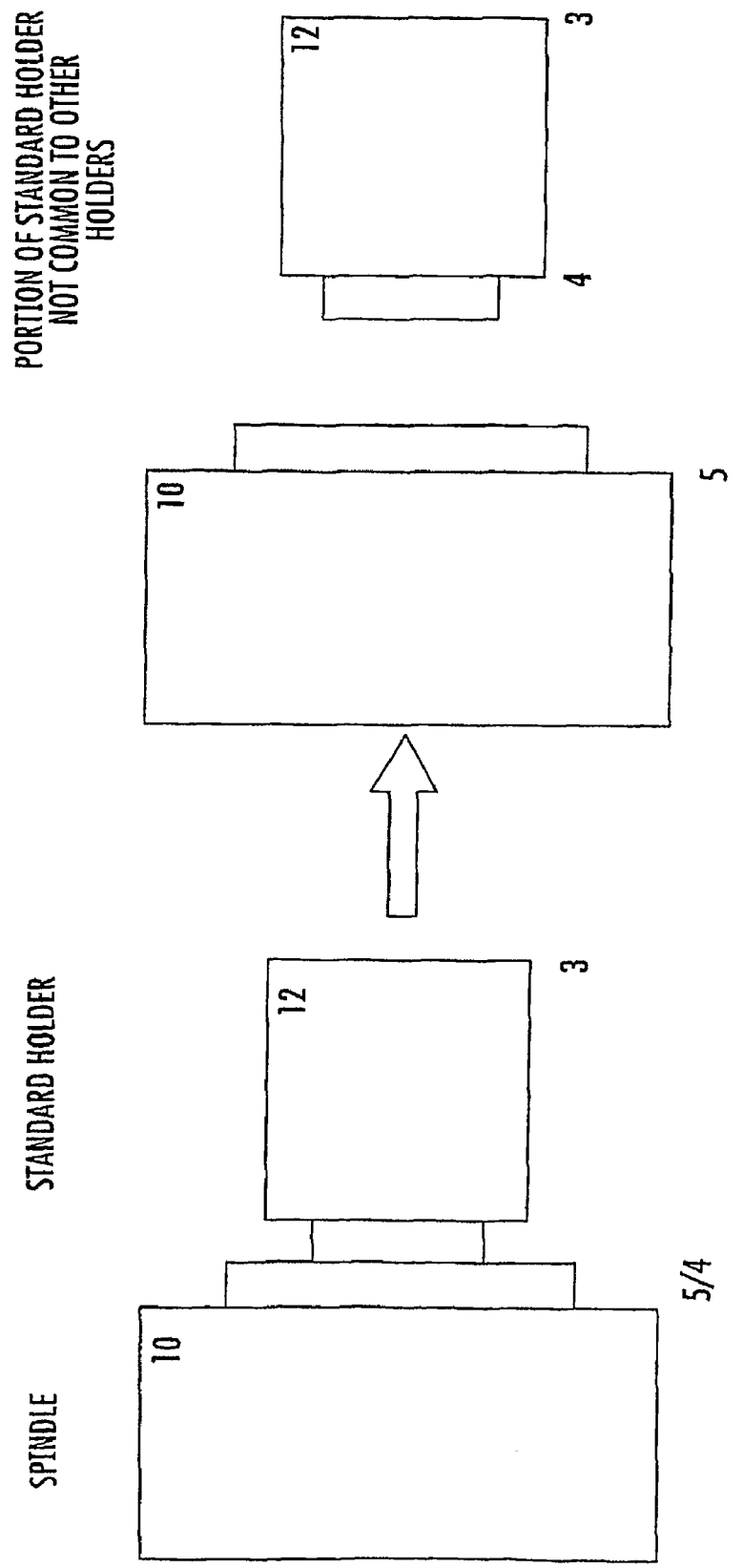
FIG. 4 is an exploded view of a spindle standard holder, according to another embodiment of the present invention

To further illustrate the procedures performed by the system 100, an exemplary model is used. The model is schematically represented in FIG. 3 and is composed of three components and five coordinates. As shown, the five coordinates are labeled 1 through 5. The tool free end 1 and location along the shank where the tool is inserted in the holder 2 are two of the coordinates. Coordinate 3 is at the end of the holder, and coordinate 4 is located at the base of the holder. The free end of the spindle where the holder taper is inserted is coordinate 5. The system 100 determines the receptances at the free end of the spindle-holder base subassembly, $GS_{55}(\omega)$. Firstly, the standard holder displacement-to-force direct and cross receptances are determined by the displacement-to-force receptance determining module 102. The standard holder geometry can be selected to generate data that approximates a broad range of potential holders. Secondly, the results generated by the displacement-to-force receptance determining module 102 are manipulated by the direct receptances determining module 104 to determine the three other direct receptances at the free end of the standard holder. Thirdly, the section of the standard holder which is not common to other holders is removed using inverse receptance coupling to determine all four spindle-holder base subassembly receptances, as schematically illustrated in FIG. 4.

Once the standard holder is mounted in a spindle, the four subassembly receptances are determined by measuring the direct, $H_{33}$, and cross, $H_{33b}$, and/or $H_{33c}$, displacement-to-force receptances on the standard holder, applying a $2^{nd}$-order backward finite difference method to find $L_{33}$ (and, equivalently, $N_{33}$), and then synthesizing $P_{33}$. Note that a $1^{st}$-order (or higher order) finite difference approach can alternately be selected. For the $1^{st}$-order approach, only $H_{33}$ and $H_{33b}$ are required. For the cross displacement-to-force measurements, the distance between the measurements on the standard holder, S, is preferably selected to increase the difference in relative amplitudes between $H_{33}$, $H_{33b}$, and/or $H_{33c}$ without leading to a poor signal-to-noise ratio for the $H_{33b}$ and/or $H_{33c}$ measurements (i.e., many of the lower frequency spindle-holder modes resemble a fixed-free fundamental mode shape and have very small amplitudes near the spindle face for the bandwidth of interest). Practically, it has been observed that the finite difference results improve as S is increased; however, care should be taken to ensure that the location of the $H_{33b}$ and/or $H_{33c}$ measurements provides sufficient signal-to-noise. The receptance $L_{33}$ is determined from the measured displacement-to-force receptances using Eq. (7) in the $2^{nd}$-order case. By reciprocity, $N_{33}$ may be set equal to $L_{33}$. The remaining receptance, $P_{33}$, is synthesized from $H_{33}$, $L_{33}$, and $N_{33}$, as shown in Eq. (8).

$$L_{33} = \frac{3H_{33} - 4H_{33b} + H_{33c}}{2S} \quad (7)$$

$$P_{33} = \frac{\Theta_3}{M_3} = \frac{F_3}{X_3} \frac{X_3}{M_3} \frac{\Theta_3}{F_3} = \frac{1}{H_{33}} L_{33} N_{33} = \frac{L_{33}^2}{H_{33}} \quad (8)$$

Due to the subtraction of the similarly scaled $H_{33}$, $H_{33b}$, and/or $H_{33c}$ receptances, noise in the measurement data may detrimentally affect the quality of $L_{33}$ and $N_{33}$ (produced by the finite-difference method) and, therefore, $P_{33}$. To reduce the noise effect, the measured receptance data may be smoothed using a Savitzky-Golay filter, for example, which performs a local polynomial regression to determine the smoothed value for each data point, or equivalent filter prior to the application of Eq. 7. Other smoothing schemes may also be applied as necessary.

The extended holder subassembly for a standard holder can include individual substructures, such as a pair of solid, cylindrical substructures, designated for convenience as substructures I and II. However, it is not required that the substructures be solid or cylindrical. Equations (9-12) provide the direct and cross extended holder subassembly receptance matrices, where rigid coupling has been applied. These equations were determined from Eqs. (3-6) by appropriate substitutions.

$$GS_{33}(\omega) = \begin{bmatrix} \frac{X_3}{F_3} & \frac{X_3}{M_3} \\ \frac{\Theta_3}{F_3} & \frac{\Theta_3}{M_3} \end{bmatrix} \quad (9)$$
$$= R_{33}(\omega) - R_{33a}(\omega)[R_{3a3a}(\omega) + R_{3b3b}(\omega)]^{-1} R_{3a3}(\omega)$$

$$GS_{44}(\omega) = \begin{bmatrix} \frac{X_4}{F_4} & \frac{X_4}{M_4} \\ \frac{\Theta_4}{F_4} & \frac{\Theta_4}{M_4} \end{bmatrix} \quad (10)$$
$$= R_{44}(\omega) - R_{43b}(\omega)[R_{3b3b}(\omega) + R_{3a3a}(\omega)]^{-1} R_{3b4}(\omega)$$

$$GS_{34}(\omega) = \begin{bmatrix} \frac{X_3}{F_4} & \frac{X_3}{M_4} \\ \frac{\Theta_3}{F_4} & \frac{\Theta_3}{M_4} \end{bmatrix} \quad (11)$$
$$= R_{33a}(\omega)[R_{3a3a}(\omega) + R_{3b3b}(\omega)]^{-1} R_{3b4}(\omega)$$

$$GS_{43}(\omega) = \begin{bmatrix} \frac{X_4}{F_3} & \frac{X_4}{M_3} \\ \frac{\Theta_4}{F_3} & \frac{\Theta_4}{M_3} \end{bmatrix} \quad (12)$$
$$= R_{43b}(\omega)[R_{3a3a}(\omega) + R_{3b3b}(\omega)]^{-1} R_{3a3}(\omega)$$

The spindle-holder base subassembly receptance matrix, $G_{33}(\omega)$, can be expressed as shown in Eq. 13 by rewriting Eq. 3. The left hand side of this equation is known once the steps described above are completed. Also, the extended holder subassembly receptances, $GS_{33}$, $GS_{44}$, $GS_{34}$, and $GS_{43}$, are determined using the equations provided above. Therefore, Eq. 13 may be rewritten to solve for the spindle-holder base subassembly receptances, $GS_{55}(\omega)$. See Eq. 14.

$$G_{33}(\omega) = \begin{bmatrix} H_{33} & L_{33} \\ N_{33} & P_{33} \end{bmatrix} \quad (13)$$
$$= GS_{33}(\omega) - GS_{34}(\omega)[GS_{44}(\omega) + GS_{55}(\omega)]^{-1} GS_{43}(\omega)$$

$$GS_{55}(\omega) = \begin{bmatrix} \frac{x_5}{f_5} & \frac{x_5}{m_5} \\ \frac{\Theta_5}{f_5} & \frac{\Theta_5}{m_5} \end{bmatrix} \quad (14)$$
$$= GS_{43}(\omega)[GS_{33}(\omega) - G_{33}(\omega)]^{-1} GS_{43}(\omega) - GS_{44}(\omega)$$

Once the spindle-holder base subassembly receptances, $GS_{55}(\omega)$, have been determined, the assembly response is determined by coupling the desired substructures. As the number of substructures is increased, the basic procedure remains the same; however, substructure I is first coupled to substructure II, then the resulting subassembly is coupled to substructure III, and so on to produce the required assembly receptances. This may be done for any number of substructures.

For example, the spindle-holder base subassembly may be coupled to the extended holder subassembly using Eq. (13) to determine the receptances at the free end of the holder, $G_{33}(\omega)$. Euler-Bernoulli, Timoshenko or other beam models may be applied to develop the extended holder receptances.

To predict the tool point dynamics, the spindle-base receptances determined by the system 100 module 108 can be coupled to models of the desired holder and tool. The assembly can, in one embodiment, be divided into the spindle-holder base subassembly and a selected number of substructures of differing diameters that represent the holder and tool. Each substructure may be presumed to be a hollow or solid steel cylindrical beam according to the substructure geometry. In one embodiment, all substructures may be modeled using a composite modulus and mass for the portions of the holder with the tool inserted to account for the material differences between the holder and tool, if applicable. The mass expression for these substructures may be replaced with the composite mass shown in Eq. 15, where $\rho_h$ and $\rho_t$ are the density of the holder and tool, respectively and $d_o$ and $d_i$ are the outer and inner diameters, respectively.

$$m = \frac{\pi(\rho_h(d_o^2 - d_i^2) + \rho_t d_i^2)L}{4} \quad (15)$$

$$EI = E_h I_h + E_t I_t = \frac{E_h \pi (d_o^4 - d_i^4) + E_t \pi d_i^4}{64} \quad (16)$$

After the spindle-holder base subassembly receptances have been obtained, the next step is to rigidly or flexibly couple the extended holder and tool substructures to produce the direct and cross extended holder-tool subassembly receptances at the ends. The final step in the procedure is to predict the tool point dynamics by rigidly or flexibly coupling the extended holder-tool subassembly to the spindle-holder base subassembly. With the appropriate coordinate substitution in Eq. 13, the tool point receptance, $G_{11}(\omega)$, may be determined according to Eq. 17, where the receptances associated with coordinates 1 and 4 are the direct and cross end receptances at the end of the extended holder-tool subassembly.

$$G_{11}(\omega) = GS_{11} - GS_{14}(GS_{44} + GS_{55})^{-1} GS_{41} \quad (17)$$

For a quill-type or other spindle, the dynamics may vary with quill extension depending on the machine design. For example, bending modes of the quill may become more flexible at longer extensions. Therefore, for some embodiments, the standard holder responses may be recorded at multiple quill positions.

Accordingly, the system 100 and the procedures implemented by the system provide a method for automatically determining predictions for any machine using a single set of measurements. In contrast to conventional systems and procedures, the system 100 and procedures of the present invention do not require hundreds of measurements. The present invention accomplishes this by using the receptance coupling substructure analysis (RCSA) described herein.

To enable RCSA predictions for a wide variety of machine-spindle-holder-tool combinations, a three-component model can be utilized. According to this model, the machine-spindle-holder-tool substructure is separated into three parts: (1) the machine, spindle, holder taper, and portion of the holder nearest the spindle with standard geometry from one holder to another (referred to as the "spindle-holder base subassembly"); (2) the remaining portion of the holder from the base to the free end (referred to as the "extended holder subassembly"); and (3) the cutting tool.

It should be noted from the preceding discussion that the present invention enables the determination of the rotation-to-force/moment and displacement-to-force/moment receptances for the free end of the spindle-holder base subassembly utilizing only displacement-to-force measurements. The procedures, as described herein, involve direct and cross displacement-to-force measurements of a simple geometry standard holder clamped in the spindle that is to be modeled. The portion of the standard holder beyond the section with consistent geometry from holder to holder can then be removed in a simulation using an inverse receptance coupling approach (i.e., decomposition) to identify the four spindle-holder base subassembly receptances. These receptances can then be coupled to models of the actual holder and tool. In this way, the tool point response for any holder and tool combination can be predicted from a single set of measurements completed on the selected machine-spindle.

Figure 5:
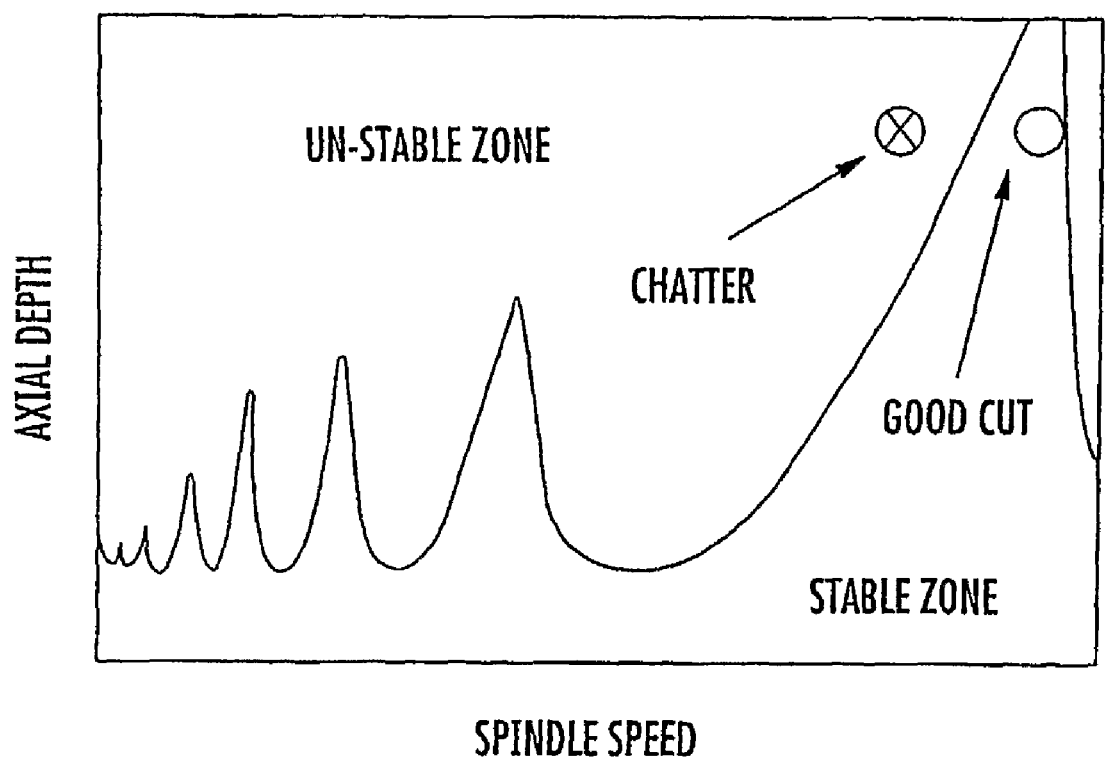
FIG. 5 is an exemplary stability lobe diagram generated according to yet another embodiment of the invention.

Yet another embodiment of the invention is a method to generate a stability lobe diagram for a selected tool using a series of steps. An exemplary stability lobe diagram is shown in FIG. 5. The steps are designed to predict the dynamics for a spindle-holder-tool assembly using the RCSA model. The procedure can be illustrated using the model illustrated schematically in FIG. 3., which as already noted is composed of three components and five coordinates labeled 1 through 5.

Stability lobe diagram generation, according to this embodiment, includes the step of determining the spindle-base receptances using a standard holder. If the spindle receptances cannot be measured directly, a standard holder of simple geometry can be used, as described above. In one embodiment, the geometry is cylindrical, but it is to be understood that other geometries may also be used including, but not limited to, triangular, rectangular, pentagonal, and hexagonal (as well as solid or hollow). It is also to be understood that, in an alternative embodiment, if the spindle receptances can be measured directly, the methods of the present invention can measure these receptances directly. Also, if the spindle receptances can be accurately predicted, this approach can be used to couple arbitrary holders and tools to the spindle receptances analytically.

When a standard holder is used, the dynamic response of the spindle-standard holder is measured, and then the portion of the holder outside the spindle is removed (using inverse RCSA in simulation) to predict the spindle response.

More specifically, according to this embodiment, the spindle-standard holder subassembly translational receptances are measured and the rotational receptances are calculated at the free end. Next, the spindle-standard holder model is separated into two components. This, again, is schematically illustrated in FIG. 4. The spindle end and taper, or the portion of the holder inside the spindle 10, forms one component. The other component is formed from the geometric-shaped portion of the standard holder 12 that is not common to other holders. In one embodiment, an analytic model is developed of the geometric-shaped portion of the standard holder. In another embodiment, a finite element model is developed of the geometric-shaped portion of the standard holder. In either embodiment, these models are developed using one or more holder dimensions and/or nominal material properties including, but not limited to, the geometry of the holder, Young's modulus, E; density, $\rho$; and/or structural damping factor, $\eta$. Finally, using the RCSA, the spindle dynamic response is determined.

Once the spindle dynamic response has been determined, the spindle dynamic model is coupled to the actual holder using a connection. In one embodiment, the connection is a rigid connection. Again, either an analytic model, in one embodiment, or a finite element model, in an alternative embodiment, is developed using one or more holder dimensions and/or nominal material properties including, but not limited to, Young's modulus, E; density, $\rho$; and/or structural damping factor, $\eta$.

The spindle-holder component is coupled to the tool model using another connection, which can be rigid or flexible with damping included. Using the result from this coupling, the stability lobe diagram can be generated without requiring a new measurement for each holder and tool combination for a particular spindle to complete the method of the present invention according to one embodiment of the present invention.

More specifically, in regards to the specific determinations for obtaining the stability lobe diagrams, a series of analyses is performed, with a plurality of equations used to determine the stability lobe diagram for a particular tool using the predicted tool point frequency response. It is to be understood that the following discussion is for exemplary purposes only and it is contemplated that other analyses and/or equations may be used provided the function of determining a stability lobe diagram for a particular tool is accomplished.

It is to be understood that while the invention has been described in conjunction with the specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

EXAMPLES

As revealed by the examples presented here, the methods of the present invention are capable of accurately predicting the dynamics for a particular tool. In a first example, a standard holder was replaced with a shrink fit tool holder and the response at the free end of the holder was predicted. In a second example, the standard holder was replaced with a shrink fit tool holder and a tool blank.

Figure 6:
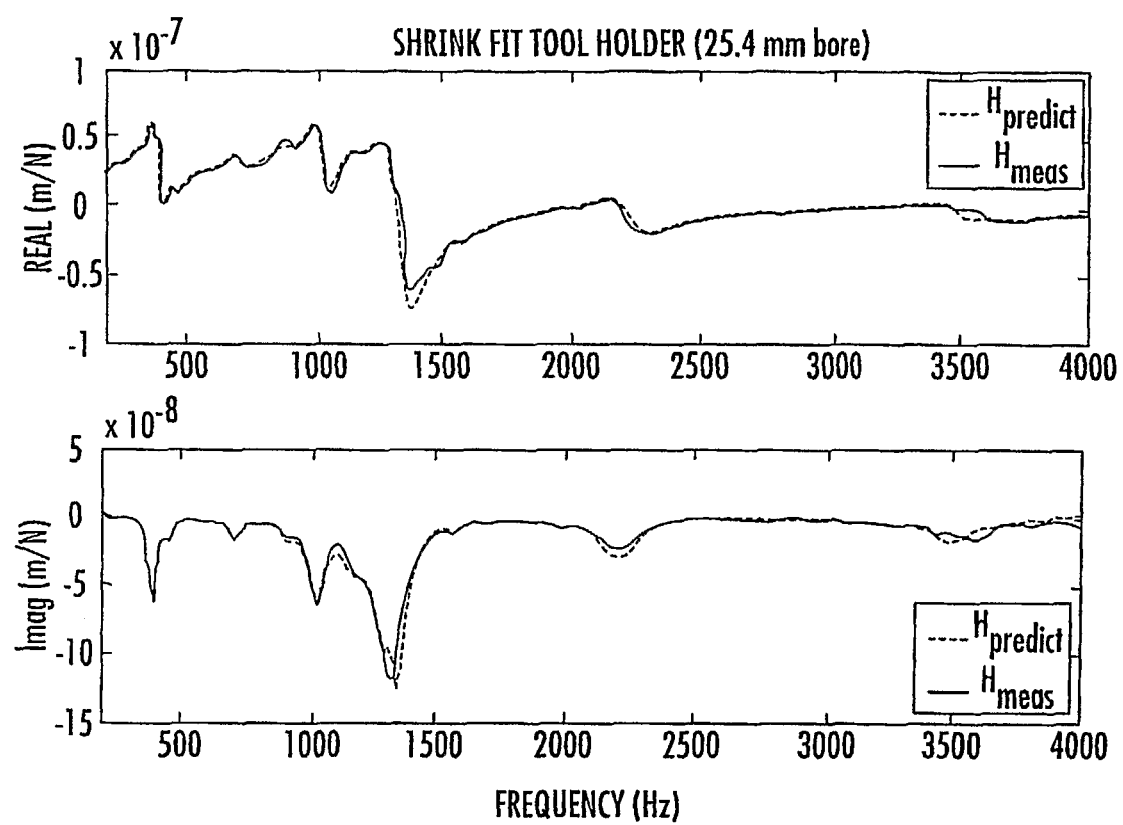
FIG. 6 is a plot showing the measured and predicted results of a spindle-holder for a first example of the invention.

In the first example, a shrink fit holder with a 25.4 mm bore with no tool inserted was predicted. Measurements were performed using a standard holder and inverse RCSA was applied to identify the spindle response. An analytical model of the steel holder was then developed using the holder geometry and nominal material property values for the holder (E=200 GPa, $\rho$=7800 kg/m$^3$, $\eta$=0.0015). This model was then coupled to the inverse RCSA spindle receptances. The measured and predicted assembly responses (at the holder free end) are shown in FIG. 6. As shown, good agreement was observed with multiple spindle modes (e.g. at 400 Hz, 700 Hz, 1000 Hz, 1300 Hz, 2300 Hz, and 3500 Hz) captured by the RCSA model.

Figure 7:
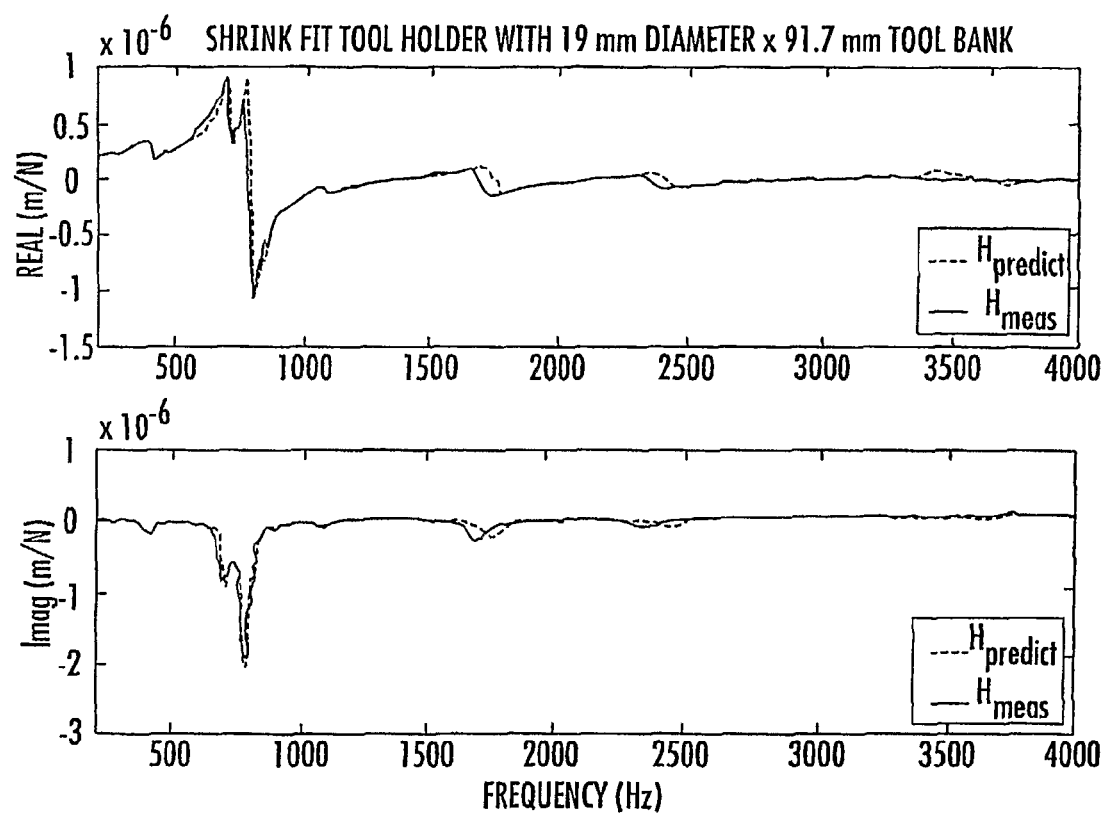
FIG. 7 is a plot showing the measured and predicted results of a spindle-holder-tool for a second example of the invention.

In the second example, a shrink fit holder with a 19.05 mm bore, a 19.05 mm×152 mm long tool blank was predicted. The same spindle receptances (obtained using the standard holder and setup and inverse RCSA) were again applied. Analytical models of the steel holder (E=200 GPa, $\rho$=7800 kg/m$^3$, $\eta$=0.0015) and carbide tool blank (E=585 GPa, $\rho$=14250 kg/m$^3$, $\eta$=0.0015) were developed. These models were then coupled to the inverse RCSA spindle receptances. The tool blank overhang length was 92 mm. The measured and predicted responses at the tool free end are shown in FIG. 7. Good agreement was again seen in this example.

Note that to make this prediction, no frequency response measurements were carried out on the holder or tool. The only information utilized was their geometry and materials. Additionally, no fitting parameters were applied and all connections were presumed to be rigid, although this is not a strict requirement of the invention (flexible connections are also acceptable). The flexibility of this model to couple arbitrary holder-tool combinations to the calculated spindle receptances is one of the primary benefits of the present invention.

FIG. 7 verifies the ability of the present invention method to predict spindle-holder-tool assembly receptances based on the measurement of a standard holder clamped in the spindle. This predictive capability leads to two potential scenarios: 1) provided the machine-spindle subassembly is sufficiently repeatable as delivered from the manufacturer and the spindle has not been damaged by, for example, a crash or excessive chatter, a single set of measurements completed using a standard holder in a representative spindle could be used to predict the dynamic behavior of any tool-holder combination for all machine-spindle combinations that are manufactured to the same specifications; or 2) sufficient repeatability does not exist between machine-spindle pairs so that the standard holder measurements must be performed on each machine-spindle (prior to leaving the factory, for example). In either case, however, significant reductions in the number of the measurements required to characterize the dynamic behavior of arbitrary tool-holder combinations may be achieved using the present invention.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A computer-implemented method for predicting a three component tool point response of a spindle-holder-tool assembly to be used for high-speed machining applications, the method comprising:
    determining direct and cross displacement-to-force receptances of a standard holder clamped in the spindle;
    based at least in part upon the determined direct and cross displacement-to-force receptances, determining direct receptances at a free end of the standard holder;
    performing an inverse receptance coupling to simulate a decomposition of the standard holder into a plurality of subassemblies comprising a spindle-holder base subassembly and an extended standard holder subassembly to determine spindle-holder base subassembly receptances; and
    determining a tool point response by coupling tool holder receptances and tool receptances to the spindle-holder base subassembly receptances.

2. The computer-implemented method of claim 1, wherein the step of determining direct receptances at the free end of the standard holder comprises performing a finite difference calculation to determine at least one direct receptance and synthesizing at least one other direct receptance based on the at least one determined direct receptance and the direct displacement-to-force receptance of the standard holder.

3. The computer-implemented method of claim 2, wherein the finite difference calculation is based on calculating a second-order backward finite difference.

4. The computer-implemented method of claim 2, wherein the finite difference calculation is based on calculating a first-order backward finite difference.

5. The computer-implemented method of claim 1, further comprising performing a local polynomial regression using a Savitzky-Golay filter to reduce a noise effect by smoothing receptance data.

6. The computer-implemented method of claim 1, wherein the extended holder subassembly comprises a pair of substructures and wherein receptances for each of the pair are determined by calculating Euler-Bernoulli or finite element free-free beam receptances.

7. The computer-implemented method of claim 1, wherein the shape of the standard holder is substantially cylindrical, triangular, rectangular, pentagonal, or hexagonal with solid or hollow cross-section.

8. A system for predicting a three component tool point response of a spindle-holder-tool assembly to be used for high-speed machining applications, the system comprising one or more processors and configured to:
    determine direct and cross displacement-to-force receptances of a standard holder clamped in the spindle based at least in part on received data;
    determine direct receptances at a free end of the standard holder based at least in part upon the determined direct and cross displacement-to-force receptances of the standard holder;
    simulate a decomposition of the standard holder into a plurality of subassemblies comprising a spindle-holder base subassembly and an extended standard holder subassembly to determine spindle-holder base subassembly receptances, the decomposition based at least in part upon inverse receptance coupling; and
    determine a tool point response by coupling tool holder receptances and tool receptances to the spindle-holder base subassembly receptances.

9. The system of claim 8, wherein the system is further configured to perform a finite difference calculation to determine at least one direct receptance and synthesize at least one other direct receptance based on the at least one determined direct receptance and the direct displacement-to-force receptance of the standard holder.

10. The system of claim 8, wherein determining direct receptances at the free end of the standard holder comprises calculating a second-order backward finite difference.

11. The system of claim 8, wherein determining direct receptances at the free end of the standard holder comprises calculating a first-order backward finite difference.

12. The system of claim 8, wherein the system is further configured to perform a local polynomial regression using a Savitzky-Golay filter to reduce a noise effect by smoothing receptance data.

13. The system of claim 8, wherein the system is further configured to simulate a decomposition of the extended holder subassembly into a pair of substructures and calculate receptances for each of the pair by calculating free-free beam receptances.

* * * * *